United States Patent
Oidemizu et al.

(10) Patent No.: US 12,092,474 B2
(45) Date of Patent: Sep. 17, 2024

(54) CONTROL APPARATUS, NON-TRANSITORY COMPUTER READABLE MEDIUM, AND CONTROL METHOD

(71) Applicant: TOYOTA JIDOSHA KABUSHIKI KAISHA, Toyota (JP)

(72) Inventors: Takayuki Oidemizu, Nagakute (JP); Kazuyuki Inoue, Nagoya (JP); Ryosuke Kobayashi, Nagakute (JP); Yurika Tanaka, Yokosuka (JP); Tomokazu Maya, Nagoya (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 17/348,135

(22) Filed: Jun. 15, 2021

(65) Prior Publication Data
US 2022/0003564 A1    Jan. 6, 2022

(30) Foreign Application Priority Data
Jul. 1, 2020 (JP) .................................. 2020-114495

(51) Int. Cl.
 *G01C 21/34* (2006.01)
 *G01C 21/36* (2006.01)
 *G06Q 50/40* (2024.01)
(52) U.S. Cl.
 CPC ..... *G01C 21/3492* (2013.01); *G01C 21/3626* (2013.01); *G01C 21/3697* (2013.01); *G06Q 50/40* (2024.01)

(58) Field of Classification Search
 CPC ............ G01C 21/3492; G01C 21/3626; G01C 21/3697; G06Q 50/30
 See application file for complete search history.

(56) References Cited

U.S. PATENT DOCUMENTS

| | | | |
|---|---|---|---|
| 2003/0236614 A1* | 12/2003 | Yamakita | G01C 21/20 701/500 |
| 2011/0040621 A1* | 2/2011 | Ginsberg | G01C 21/3492 340/905 |

(Continued)

FOREIGN PATENT DOCUMENTS

| | | |
|---|---|---|
| CN | 105427640 A | 3/2016 |
| JP | 2012-027779 A | 2/2012 |

(Continued)

OTHER PUBLICATIONS

Machine Translation JP 2016188776 (Year: 2016).*
Machine Translation JP 2016081254 (Year: 2016).*

*Primary Examiner* — Anne Marie Antonucci
*Assistant Examiner* — Patrick M Brady
(74) *Attorney, Agent, or Firm* — Oliff PLC

(57) ABSTRACT

A control apparatus includes a controller configured to acquire route information indicating a route on which a user is to travel, and travel information indicating a travel status of the user, detect, based on the acquired route information and the acquired travel information, a waiting point on the route, at which a waiting time period for the user is to occur, and output deceleration information for prompting the user to decelerate to delay, within a range of the waiting time period, arrival of the user at the detected waiting point.

4 Claims, 12 Drawing Sheets

(56) References Cited

U.S. PATENT DOCUMENTS

| | | | |
|---|---|---|---|
| 2011/0098916 A1* | 4/2011 | Jang | G01C 21/3697 |
| | | | 701/533 |
| 2013/0261775 A1* | 10/2013 | Ono | G01S 19/19 |
| | | | 700/91 |
| 2014/0046581 A1* | 2/2014 | Ota | G08G 1/09626 |
| | | | 701/408 |
| 2018/0075739 A1* | 3/2018 | Ginsberg | B60K 35/00 |
| 2018/0172461 A1* | 6/2018 | Katayama | G01C 21/3617 |
| 2019/0120639 A1* | 4/2019 | Song | G01C 21/3484 |
| 2019/0128681 A1 | 5/2019 | Hans et al. | |
| 2020/0318985 A1* | 10/2020 | Kim | G01C 21/3629 |

FOREIGN PATENT DOCUMENTS

| | | | |
|---|---|---|---|
| JP | 2016081254 A | * | 5/2016 |
| JP | 2016188776 A | * | 11/2016 |
| JP | 2018-066681 A | | 4/2018 |
| KR | 20160018940 A | | 2/2016 |

* cited by examiner

FIG. 3

| TARGET TRAFFIC SIGNAL | TIME | SIGNAL LAMP OF TRAFFIC SIGNAL |
|---|---|---|
| 50 A | 2020/4/1  8:00:00 | RED |
| 50 B | 2020/4/1  8:01:00 | GREEN |
| 50 A | 2020/4/1  8:01:30 | GREEN |
| 50 B | 2020/4/1  8:01:45 | RED |
| 50 A | 2020/4/1  8:02:00 | RED |
| 50 B | 2020/4/1  8:02:15 | GREEN |
| 50 A | 2020/4/1  8:02:30 | GREEN |
| ... | ... | ... |

FIG. 9
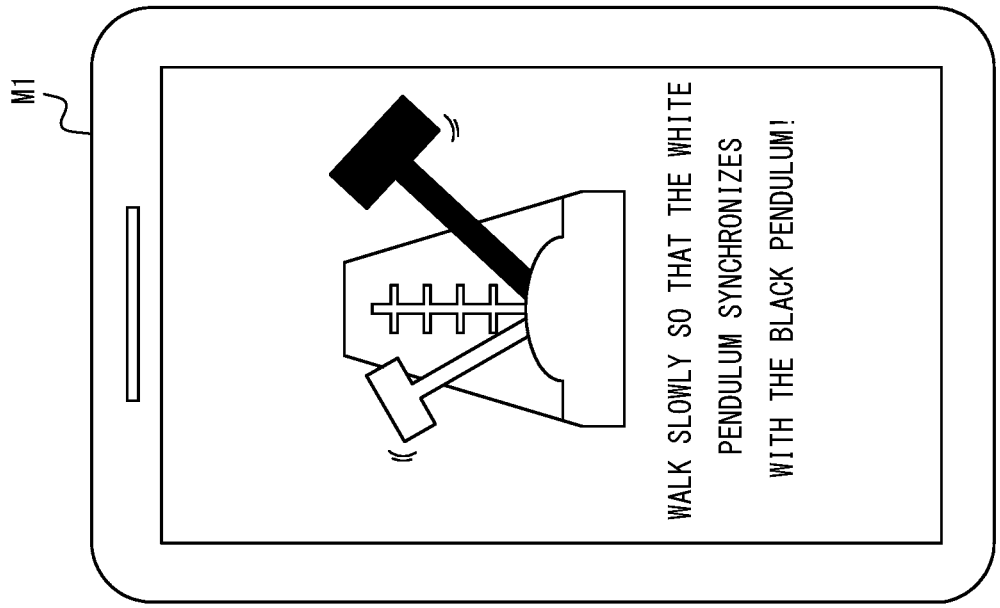
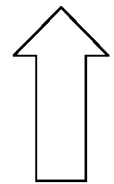
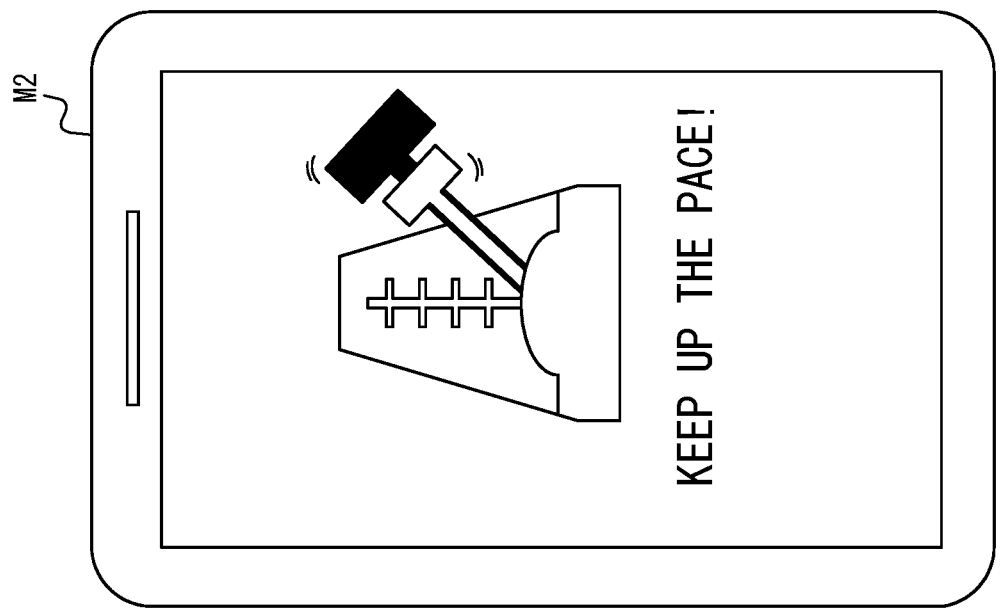

FIG. 10

| TARGET STOP | DEPARTURE TIME |
|---|---|
| 90 A | 2020/4/1  7:50:00 |
| 90 B | 2020/4/1  7:53:00 |
| 90 A | 2020/4/1  8:01:00 |
| 90 B | 2020/4/1  8:03:00 |
| 90 A | 2020/4/1  8:15:00 |
| 90 B | 2020/4/1  8:30:00 |
| 90 A | 2020/4/1  8:35:00 |
| ⋮ | ⋮ |

CONTROL APPARATUS, NON-TRANSITORY COMPUTER READABLE MEDIUM, AND CONTROL METHOD

CROSS-REFERENCE TO RELATED APPLICATION

This application claims priority to Japanese Patent Application No. 2020-114495, filed on Jul. 1, 2020, the entire contents of which are incorporated herein by reference.

TECHNICAL FIELD

The present disclosure relates to a control apparatus, a program, and a control method.

BACKGROUND

Patent Literature (PTL) 1 describes technology for setting, in advance, a walking section in light of a waiting time period.

CITATION LIST

Patent Literature

PTL 1: JP 2018-066681 A

SUMMARY

In the technology described in PTL 1, if a user moves more quickly than expected, it is difficult to avoid occurrence of a waiting time period.

It would be helpful to improve certainty in reducing waiting time periods.

A control apparatus according to the present disclosure includes a controller configured to:
  acquire route information indicating a route on which a user is to travel, and travel information indicating a travel status of the user;
  detect, based on the acquired route information and the acquired travel information, a waiting point on the route, at which a waiting time period for the user is to occur; and
  output deceleration information for prompting the user to decelerate to delay, within a range of the waiting time period, arrival of the user at the detected waiting point.

A program according to the present disclosure is configured to cause a computer to execute operations, the operations including:
  acquiring route information indicating a route on which a user is to travel, and travel information indicating a travel status of the user;
  detecting, based on the acquired route information and the acquired travel information, a waiting point on the route, at which a waiting time period for the user is to occur; and
  outputting deceleration information for prompting the user to decelerate to delay, within a range of the waiting time period, arrival of the user at the detected waiting point.

A control method according to the present disclosure includes:
  acquiring, by a control apparatus, route information indicating a route on which a user is to travel, and travel information indicating a travel status of the user;
  detecting, by the control apparatus based on the acquired route information and the acquired travel information, a waiting point on the route, at which a waiting time period for the user is to occur; and
  outputting, by the control apparatus, deceleration information for prompting the user to decelerate to delay, within a range of the waiting time period, arrival of the user at the detected waiting point.

According to the present disclosure, it is possible to improve certainty in reducing waiting time periods.

BRIEF DESCRIPTION OF THE DRAWINGS

In the accompanying drawings:
FIG. 3 is a diagram illustrating an example of switching information according to the first embodiment;
FIG. 9 is a diagram illustrating examples of screens displayed on an output interface of the terminal apparatus according to the first embodiment;
FIG. 10 is a diagram illustrating an example of operation information according to a second embodiment.

DETAILED DESCRIPTION

Figure 1:
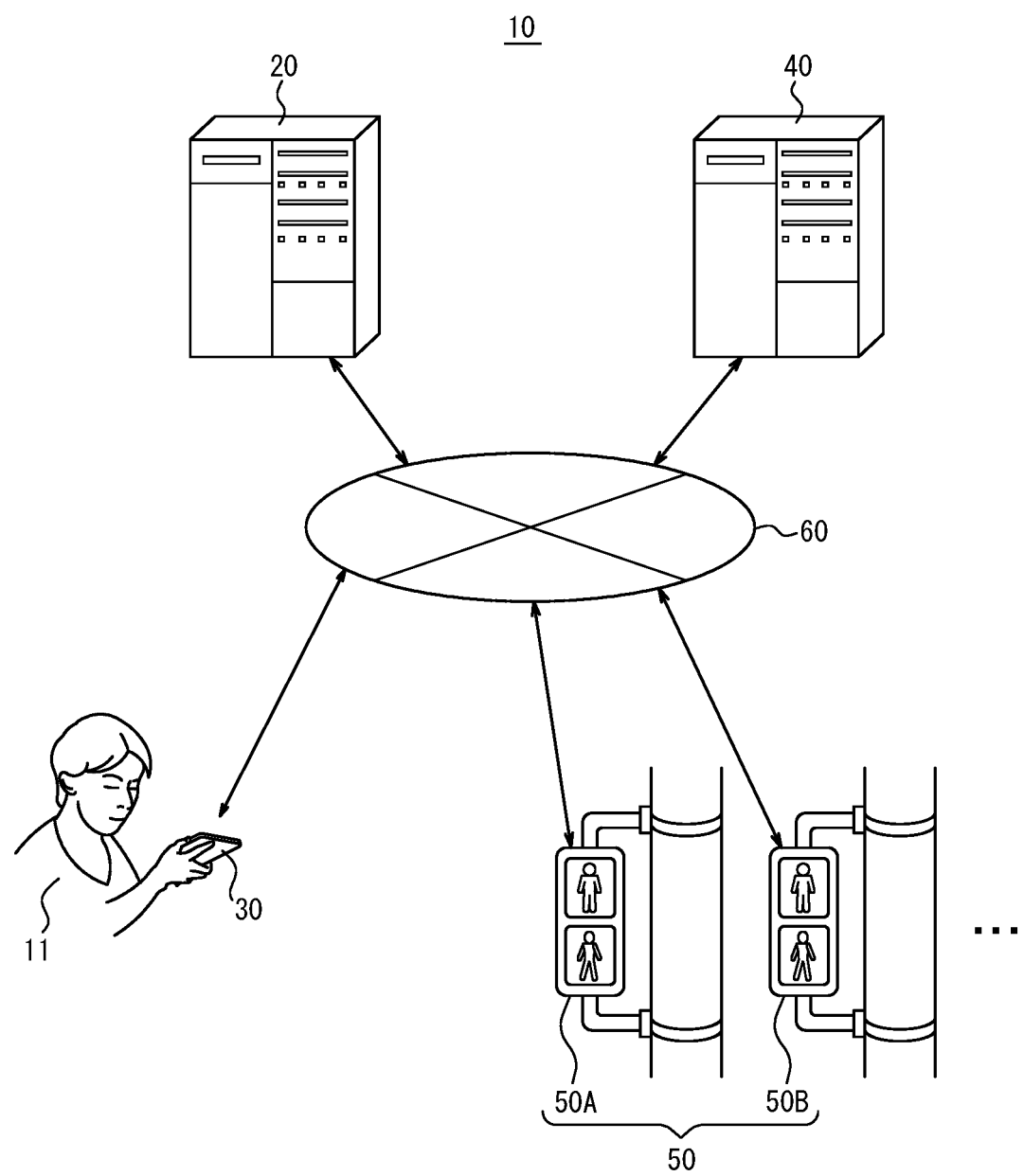
FIG. 1 is a diagram illustrating a configuration of a system according to a first embodiment.

Hereinafter, an embodiment of the present disclosure will be described with reference to the drawings.

In the drawings, the same or corresponding portions are denoted by the same reference numerals. In the descriptions of the present embodiment, detailed descriptions of the same or corresponding portions are omitted or simplified, as appropriate.

First Embodiment

A configuration of a system 10 according to the present embodiment will be described with reference to FIG. 1.

The system 10 according to the present embodiment includes a control apparatus 20, a terminal apparatus 30, a management apparatus 40, and traffic signals 50.

The control apparatus 20 can communicate with the terminal apparatus 30, the management apparatus 40, and the traffic signals 50 via a network 60.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The control apparatus 20 is installed in a facility such as a data center. The control apparatus 20 is, for example, a server that belongs to a cloud computing system or another type of computing system.

The terminal apparatus 30 is held by a user 11. The terminal apparatus 30 is, for example, a mobile device such as a mobile phone, a smartphone, a wearable device, or a tablet, or a PC. The term "PC" is an abbreviation of personal computer. The "wearable device" is specifically a mobile device that is wearable on the body of the user 11, such as a wristwatch-type device or an anklet-type device.

The traffic signals 50 control road traffic by switching colors displayed by signal lamps. The traffic signals 50 include pedestrian signals disposed at pedestrian crossings or signals disposed at intersections without pedestrian crossings. The traffic signals 50 are each equipped with two or more signal lamps that are arranged in any direction such as vertically or horizontally, and that can light up or flash in different colors from each other. The traffic signals 50 are equipped with signal lamps that can light up in at least two colors including red and green. In the present embodiment, a stop signal is indicated when, among these signal lamps, a signal lamp that can light up in red lights up, and a go signal is indicated when another signal lamp that can light up in green lights up. The traffic signals 50 may be each equipped with a signal lamp that can display yellow in addition to red and green, arrow symbols, or other traffic signals. The traffic signals 50 switch colors displayed by the signal lamps based on switching information transmitted from the management apparatus 40.

The management apparatus 40 is installed in a traffic control center. The management apparatus 40 can control the traffic signals 50 including a traffic signal 50A and a traffic signal 50B that are illustrated in FIG. 1. The management apparatus 40 is, for example, a server that belongs to a cloud computing system or another type of computing system. The management apparatus 40 is connected to the traffic signals 50 via the network 60. The management apparatus 40 can transmit switching information to the traffic signals 50, and control which of the signal lamps with which the traffic signals 50 are each equipped to turn on, flash, or turn off.

An outline of the present embodiment will be described with reference to FIG. 1.

In the system 10 illustrated in FIG. 1, the control apparatus 20 acquires route information indicating a route on which the user 11 is to travel, and travel information indicating a travel status of the user 11. The control apparatus 20 detects, based on the acquired route information and the acquired travel information, a waiting point on the route, at which a waiting time period for the user 11 is to occur. The control apparatus 20 outputs deceleration information for prompting the user 11 to decelerate to delay, within a range of the waiting time period, arrival of the user 11 at the detected waiting point.

The "route information" is specifically information indicating a route on a map, on which the user 11 is to travel to a destination, in a route guidance application that the user 11 is running. The "route information" includes switching information indicating a switching timing for a traffic signal 50 installed at at least one point on the route. The "switching information" is information that is provided from the management apparatus 40, which is held in the traffic control center, and indicates a timing at which the signal displayed by signal lamps of the traffic signal 50 changes from a green go signal indicating permission to proceed to a yellow or red stop signal indicating non-permission to proceed. The "switching information" includes information indicating target traffic signals 50, times, and signal lamp colors to be displayed at the respective times. The "travel information" includes information indicating, as the travel status of the user 11, the travel speed and the current position of the user 11 who holds the terminal apparatus 30, that are detected by the terminal apparatus 30. The "travel speed" is detected using an acceleration sensor, an angular velocity sensor, or the like that the terminal apparatus 30 includes. The "travel speed" may be detected by a sensor device such as a surveillance camera installed indoors or outdoors. The "current position" is detected using a GPS receiver or the like that the terminal apparatus 30 includes. The term "GPS" is an abbreviation of Global Positioning System. The "waiting time period" is a time period during which traveling of the user 11 is suspended at a certain point on the route, and the user 11 waits to resume traveling. The "waiting point" is a point on the route, at which the waiting time period for the user 11 is to occur. The "waiting point" includes a point at which the traffic signal 50 is installed, and at which the user 11 is to arrive while the traffic signal 50 displays a stop signal. The "deceleration information" is information notifying the user 11 of the degree to which deceleration from the current travel speed should be performed. The user 11 is notified of the "deceleration information" by the terminal apparatus 30. The notification is performed in the form of a text message, an image, sound, vibration, or the like.

According to the present embodiment, it is possible to lead users to slow down travel speeds while providing route guidance. Therefore, certainty in reducing waiting time periods is improved.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling each component of the control apparatus 20.

The communication interface 23 includes at least one interface for communication. The interface for communication is, for example, a LAN interface. The communication interface 23 receives information for use in operations of the control apparatus 20, and transmits information resulting from operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation to input information for use in operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs information resulting from operations of the control apparatus 20. The output interface 25, instead of being included in the control apparatus 20, may be connected to the control apparatus 20 as an external output device. As the connection method, any technology such as USB, HDMI®, or Bluetooth® can be used.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores information for use in operations of the control apparatus 20 and information resulting from operations of the control apparatus 20. The memory 22 stores a system program, an application program, road map information, the switching information for the traffic signals 50, and the travel information for the user 11 obtained by the terminal apparatus 30.

An example of "switching information" for traffic signals 50 is illustrated in FIG. 3. FIG. 3 illustrates a table of switching information for each of two traffic signals 50A and 50B. In the table of FIG. 3, information on target traffic signals 50, switching times, and signal lamp colors displayed at the respective switching times is stored as the "switching information". The signal lamp colors may include yellow in addition to two colors of red and green illustrated in FIG. 3. Instead of the information on signal lamp colors, information on pictures indicating permission to proceed and non-permission to proceed may be included. For example, in the table of FIG. 3, information recorded in the first row following the title row indicates that a signal lamp of the traffic signal 50A displays a red stop signal at 08:00:00 on Apr. 1, 2020. Information recorded in the third row indicates that signal lamps of the traffic signal 50A are switched to display a green go signal at 08:01:30 on Apr. 1, 2020. The switching information for the traffic signals 50 is acquired by the controller 21 from the management apparatus 40 via the communication interface 23.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be recorded on a non-transitory computer readable medium. The non-transitory computer readable medium is, for example, a magnetic recording device, an optical disc, a magneto-optical recording medium, or a semiconductor memory. The program is distributed, for example, by selling, transferring, or lending a portable recording medium such as a DVD or a CD-ROM on which the program is recorded. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program recorded on a portable recording medium or a program transferred from a server. Then, the computer reads the program stored in the main memory using a processor, and executes processes in accordance with the read program using the processor. The computer may read out a program directly from the portable recording medium and execute processing according to the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

A configuration of the terminal apparatus 30 according to the present embodiment will be described with reference to FIG. 4.

The terminal apparatus 30 includes a controller 31, a memory 32, a communication interface 33, an input interface 34, an output interface 35, a positioner 36, and a speed meter 37.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the terminal apparatus 30 while controlling each component of the terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information for use in operations of the terminal apparatus 30 and information resulting from operations of the terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives information for use in operations of the terminal apparatus 30, and transmits information resulting from operations of the terminal apparatus 30.

The input interface 34 includes at least one interface for input. The interface for input is, for example, a physical key, a capacitive key, a pointing device, a touch screen integrally provided with a display, or a microphone. The input interface 34 accepts an operation to input information for use in operations of the terminal apparatus 30. The input interface 34, instead of being included in the terminal apparatus 30, may be connected to the terminal apparatus 30 as an external input device. As the connection method, any technology such as USB, HDMI®, or Bluetooth® can be used.

The output interface 35 includes at least one interface for output. The interface for output is, for example, a display, a speaker, or a vibration motor. The display is, for example, an LCD or an organic EL display. The output interface 35 outputs information resulting from operations of the terminal apparatus 30. The output interface 35, instead of being included in the terminal apparatus 30, may be connected to the terminal apparatus 30 as an external output device. As the connection method, any technology such as USB, HDMI®, or Bluetooth® can be used.

The positioner 36 includes at least one GNSS receiver. The term

"GNSS" is an abbreviation of global navigation satellite system. GNSS includes, for example, GPS, QZSS, GLONASS, and/or Galileo. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the terminal apparatus 30.

The speed meter 37 includes at least one acceleration sensor or at least one angular velocity sensor for detecting the travel speed of the terminal apparatus 30. The speed meter 37 detects the speed while traveling, the vibration when traveling, or the like of the user 11 who holds the terminal apparatus 30.

The functions of the terminal apparatus 30 are realized by execution of a terminal program according to the present embodiment by a processor corresponding to the controller 31. That is, the functions of the terminal apparatus 30 are realized by software. The terminal program causes a computer to execute operations of the terminal apparatus 30, thereby causing the computer to function as the terminal apparatus 30. That is, the computer executes operations of the terminal apparatus 30 in accordance with the terminal program to thereby function as the terminal apparatus 30.

Some or all of the functions of the terminal apparatus 30 may be realized by a dedicated circuit corresponding to the controller 31. That is, some or all of the functions of the terminal apparatus 30 may be realized by hardware.

A configuration of the management apparatus 40 according to the present embodiment will be described with reference to FIG. 5.

The management apparatus 40 includes a controller 41, a memory 42, a communication interface 43, an input interface 44, and an output interface 45.

The controller 41 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 41 executes processes related to operations of the management apparatus 40 while controlling each component of the management apparatus 40.

The memory 42 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information for use in operations of the management apparatus 40 and information resulting from operations of the management apparatus 40. The memory 42 stores various parameters for controlling operations of the traffic signals 50, and the switching information, which is generated from the parameters. The parameters include, for example, a cycle length, which is a time period from a starting time of displaying a green go signal to a starting time of displaying the next green go signal, and a split, which is a ratio of a time period during which a signal lamp displays green to the cycle length.

The communication interface 43 includes at least one interface for communication. The interface for communication is, for example, a LAN interface. The communication interface 43 receives information for use in operations of the management apparatus 40, and transmits information resulting from operations of the management apparatus 40. The communication interface 43 transmits, to the traffic signals 50, information for controlling operations of the traffic signals 50.

The input interface 44 includes at least one interface for input. The interface for input is, for example, a physical key, a capacitive key, a pointing device, a touch screen integrally provided with a display, or a microphone. The input interface 44 accepts an operation to input information for use in operations of the management apparatus 40. The input interface 44, instead of being included in the management apparatus 40, may be connected to the management apparatus 40 as an external input device. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs information resulting from operations of the management apparatus 40. The output interface 45, instead of being included in the management apparatus 40, may be connected to the management apparatus 40 as an external output device. As the connection method, any technology such as USB, HDMI®, or Bluetooth® can be used.

The functions of the management apparatus 40 are realized by execution of a management program according to the present embodiment by a processor corresponding to the controller 41. That is, the functions of the management apparatus 40 are realized by software. The management program causes a computer to execute the operations of the management apparatus 40, thereby causing the computer to function as the management apparatus 40. That is, the computer executes the operations of the management apparatus 40 in accordance with the management program to thereby function as the management apparatus 40.

Some or all of the functions of the management apparatus 40 may be realized by a dedicated circuit corresponding to the controller 41. That is, some or all of the functions of the management apparatus 40 may be realized by hardware.

Figure 6A:
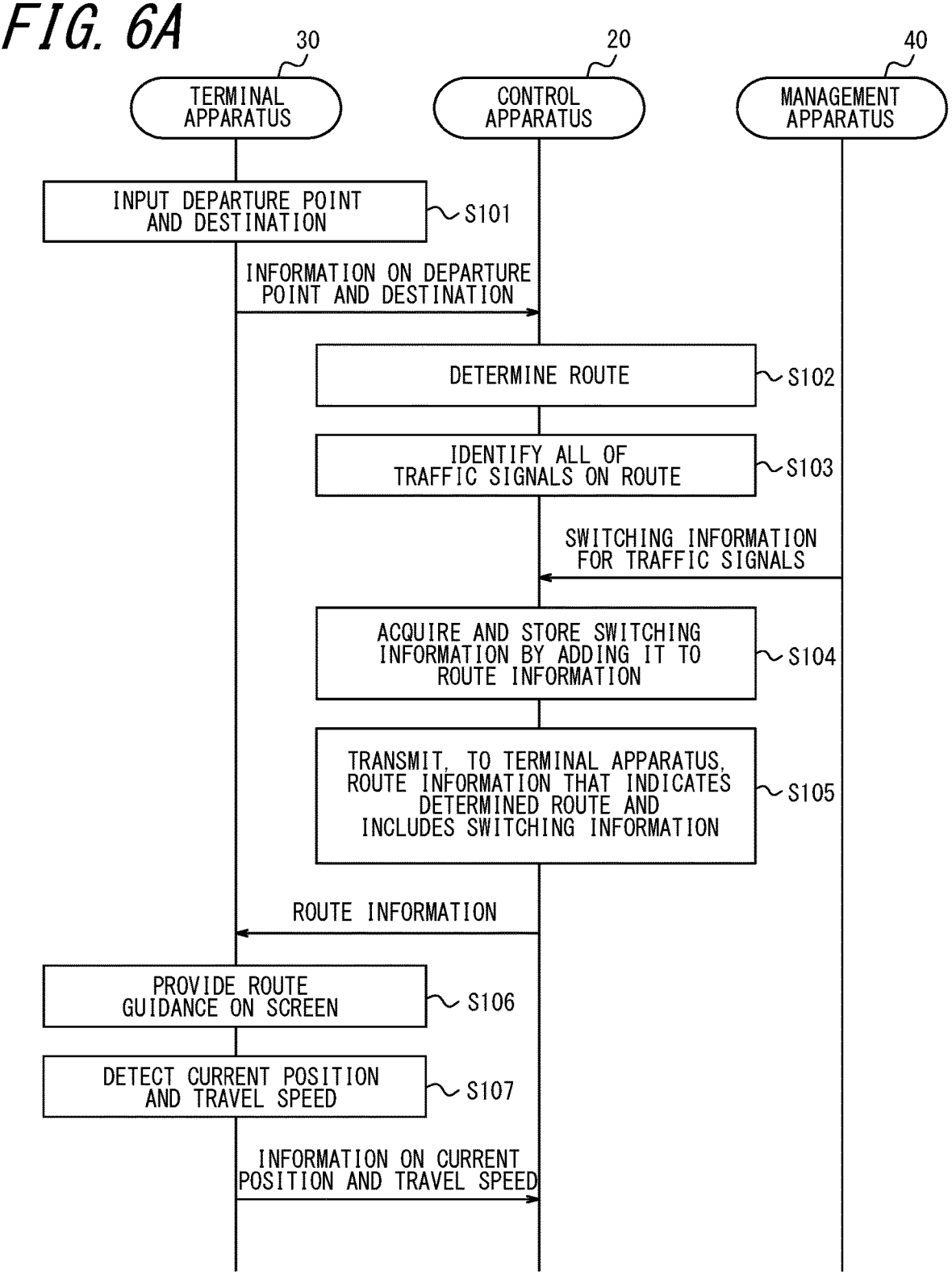
FIG. 6A is a diagram illustrating operations of the system according to the first embodiment.
Figure 6B:
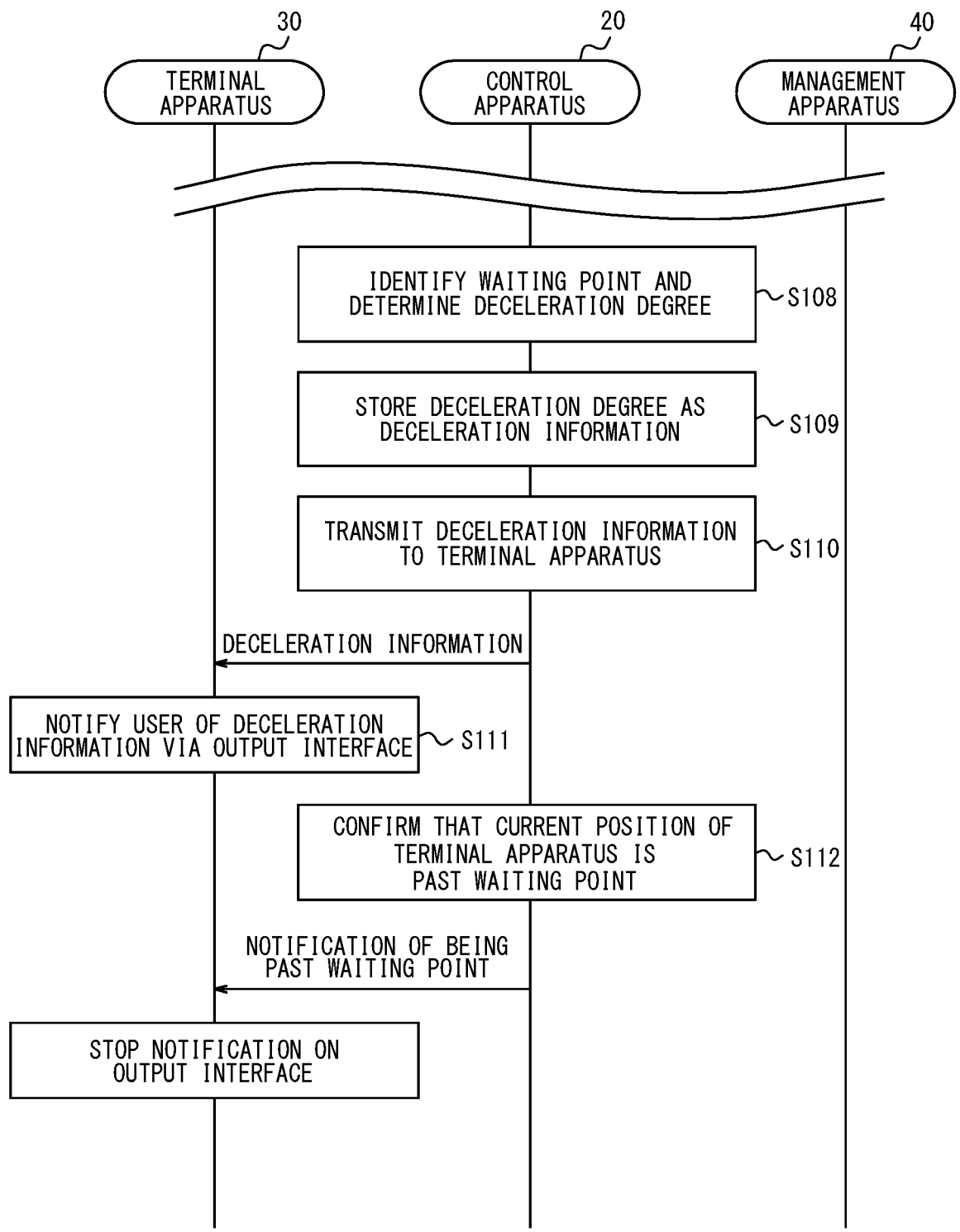
FIG. 6B is a diagram illustrating operations of the system according to the first embodiment.
Figure 7:
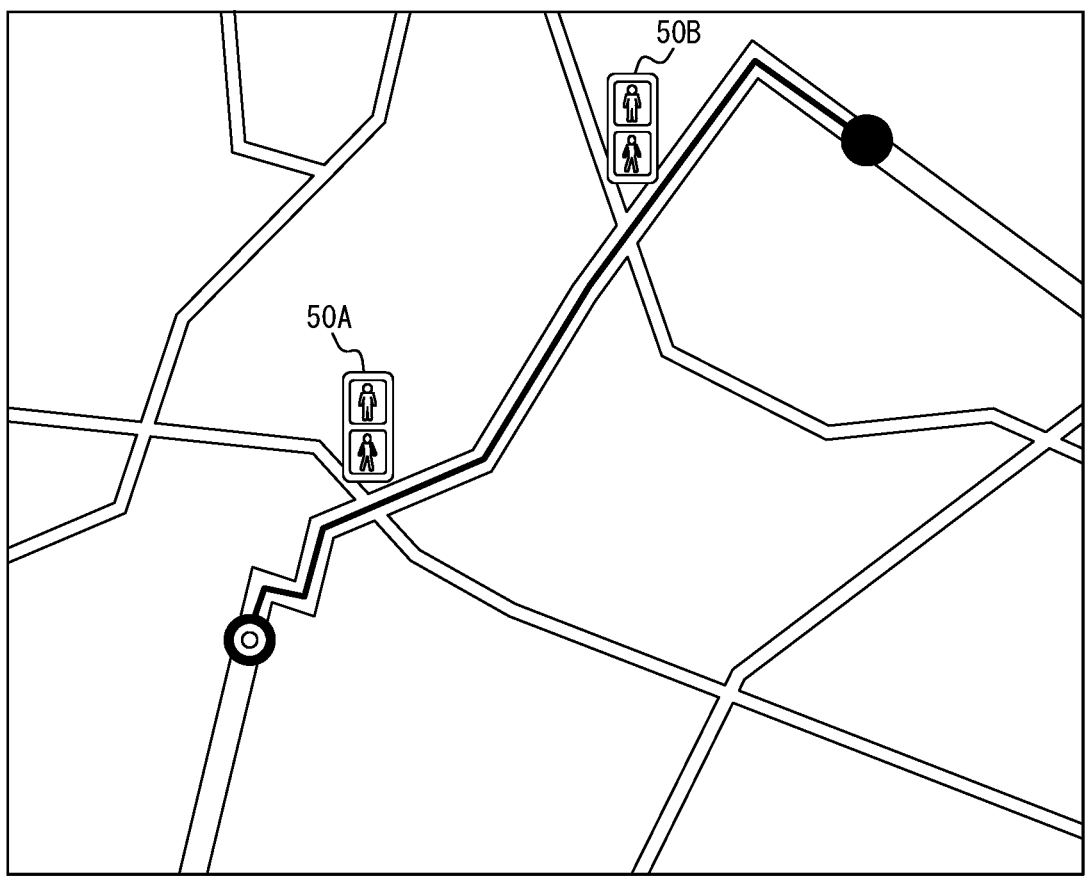
FIG. 7 is a diagram illustrating an example of a route in route guidance according to the first embodiment.
Figure 8:
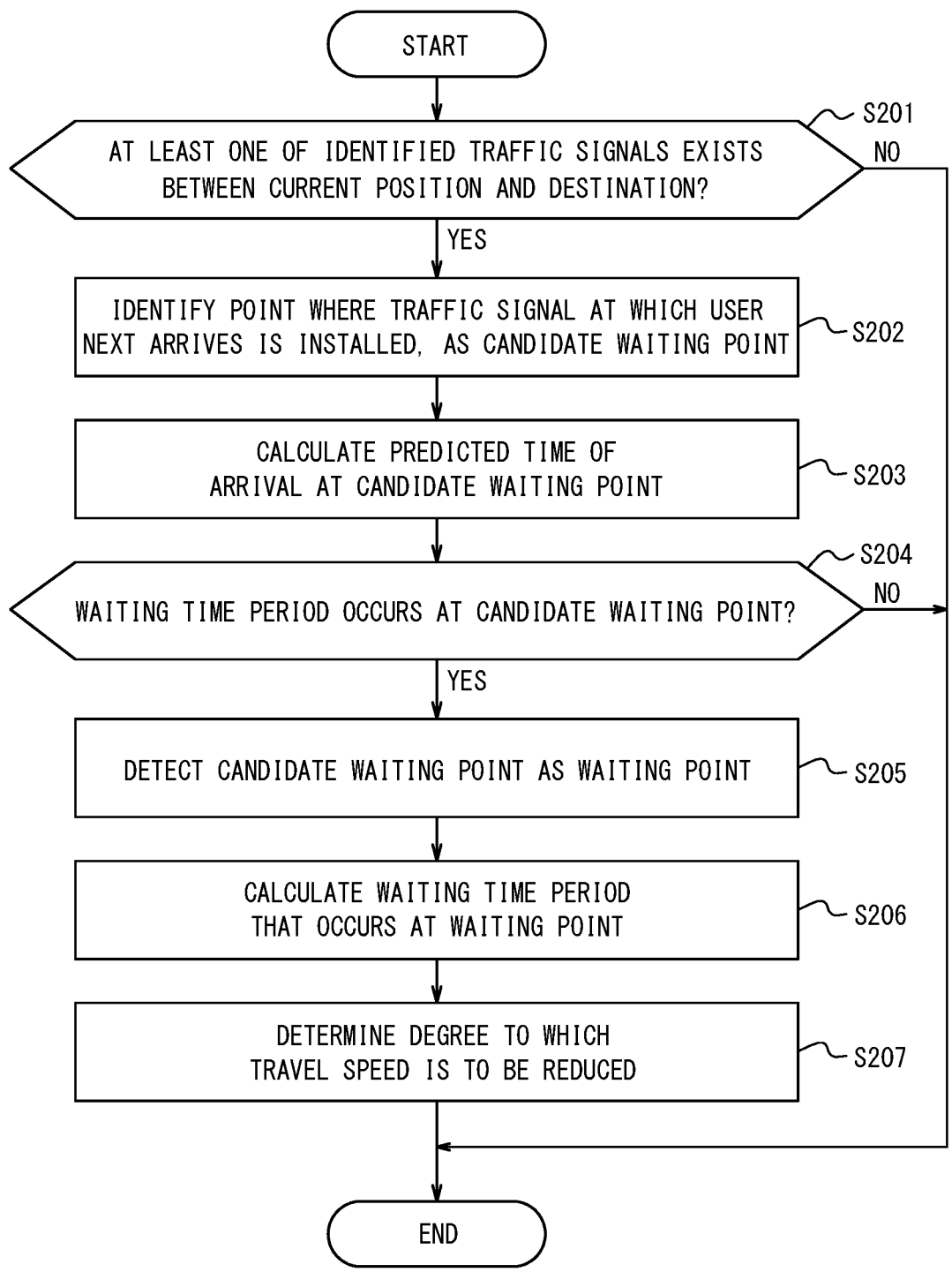
FIG. 8 is a flow chart illustrating operations of a controller of the control apparatus according to the first embodiment.

Operations of the system 10 according to the present embodiment will be described with reference to FIGS. 3, 6A, 6B, 7, 8, and 9. These operations correspond to a control method according to the present embodiment. FIG. 3 is a diagram illustrating an example of the switching information according to the present embodiment. FIGS. 6A and 6B illustrate a processing flow of the entire system 10 according to the present embodiment. FIG. 7 illustrates an example of a route in route guidance. FIG. 8 illustrates operations of the controller 21 of the control apparatus 20. FIG. 9 illustrates examples of screens displayed on the output interface 35 of the terminal apparatus 30.

As an example, suppose that an application for route guidance is running on the terminal apparatus 30 of the user 11.

In step S101, the terminal apparatus 30 accepts input of a departure point and a destination by the user 11. The user 11 inputs the departure point and the destination, for example, by tapping desired points on a map displayed on the output interface 35 of the terminal apparatus 30, or by inputting addresses. The controller 31 of the terminal apparatus 30 stores, in the memory 32, the departure point and the destination input by the user 11. The controller 31 transmits, to the control apparatus 20 via the communication interface 33, information on the departure point and the destination that are stored in the memory 32. In this example, the user 11 sets the departure point and the destination to the application for route guidance running on the terminal apparatus 30. The controller 31 of the terminal apparatus 30 notifies the control apparatus 20 of the information on the input departure point and the input destination.

The controller 21 of the control apparatus 20 receives, from the terminal apparatus 30 via the communication interface 23, the information on the departure point and the destination transmitted in step S101. The controller 21 stores, in the memory 22, the received information on the departure point and the destination. In step S102, the controller 21 determines a route to the destination in accordance with the information on the departure point and the destination stored in the memory 22, thereby acquiring route information indicating a route on which the user 11 is to travel. The controller 21 stores, as information for notifying the determined route, the acquired route information in the memory 22. In this example, the controller 21 of the control apparatus 20 calculates the route, which reaches the destination from the departure point, with reference to map information stored in advance in the memory 22. The route is, for example, a route with the shortest distance. The map information may be accumulated, instead of being stored in advance in the memory 22, in an external system such as an Internet-based GIS. The term "GIS" is an abbreviation of geographic information system.

In step S103, the controller 21 identifies all of the traffic signals 50 installed on roads to be crossed by the user 11 on the determined route. The determined route in this example and points at which the traffic signals 50 to be identified are installed are exemplified in FIG. 7. In FIG. 7, the determined route is illustrated by a solid line, the current position of the terminal apparatus 30 is illustrated by a double circle, and the destination is illustrated by a black circle. On the route to the destination, the traffic signal 50A and the traffic signal 50B are installed on the roads to be crossed by the user 11, and the controller 21 identifies these traffic signals. The controller 21 stores, in the memory 22, information on the traffic signal 50A and the traffic signal 50B that are identified.

In step S104, the controller 21 acquires, from the management apparatus 40 for controlling the traffic signal 50A and the traffic signal 50B, switching information for the traffic signal 50A and the traffic signal 50B that are identified. In this example, the controller 21 confirms that the traffic signal 50A and the traffic signal 50B have been identified with reference to the information stored in the memory 22. The controller 21 communicates with the management apparatus 40 via the communication interface 23, and acquires the switching information for the traffic signal 50A and the traffic signal 50B as illustrated in FIG. 3. The controller 21 adds the acquired switching information to the route information to store the acquired switching information in the memory 22.

In step S105, the controller 21 transmits, to the terminal apparatus 30 via the communication interface 23, the route information stored in the memory 22, that indicates the determined route and includes the switching information.

The controller 31 of the terminal apparatus 30 receives, from the control apparatus 20 via the communication interface 33, the route information transmitted in step S105. The controller 31 stores the received route information in the memory 32. In step S106, the controller 31 performs control to provide the user 11 with guidance on the route that is notified by the route information stored in the memory 32. According to this control, the output interface 35 of the terminal apparatus 30 provides the user 11, on a screen, with guidance on the route to the destination set by the user 11.

In step S107, the positioner 36 of the terminal apparatus 30 detects the current position of the terminal apparatus 30, and the speed meter 37 of the terminal apparatus 30 detects the travel speed of the terminal apparatus 30. The controller 31 transmits, to the control apparatus 20 via the communication interface 33, information notifying the detected current position and the detected travel speed of the terminal apparatus 30. The current position and the travel speed of the terminal apparatus 30 are repeatedly detected until the terminal apparatus 30 arrives at the destination, and are notified to the control apparatus 20. The controller 21 of the control apparatus 20 receives, from the terminal apparatus 30 via the communication interface 23, the information notifying the current position and the travel speed of the terminal apparatus 30, thereby acquiring travel information indicating a travel status of the user 11. That is, the controller 21 acquires the travel information from the terminal apparatus 30 for detecting the travel status of the user 11, via the communication interface 23.

In step S108, the controller 21 of the control apparatus 20 performs operations of identifying a waiting point and of determining the degree to which the travel speed of the user 11 in possession of the terminal apparatus 30 is to be reduced. Specifically, the controller 21 detects, based on the route information acquired in step S102 and the travel information acquired in step S107, a waiting point on the route indicated by the route information, at which a waiting time period for the user 11 is to occur. Then, the controller 21 generates deceleration information for prompting the user 11 to decelerate to delay, within a range of the waiting time period, arrival of the user 11 at the detected waiting point.

FIG. 8 illustrates a specific process flow of operations of the controller 21 in step S108 of FIG. 6B.

First, in step S201, the controller 21 confirms whether at least one of the traffic signals 50 identified in step S103 of FIG. 6A exists, on the route indicated by the route information, between the current position of the terminal apparatus 30 and the destination. In a case in which none of the traffic signals 50 exists, the controller 21 ends the processing. In a case in which one or more of the traffic signals 50 identified in step S103 exist, the controller 21 identifies, in step S202, a point where, among the identified traffic signals 50, the traffic signal 50 at which the user 11 next arrives is installed, as a candidate waiting point. In this example, first, the controller 21 confirms that the identified traffic signals 50 are the traffic signal 50A and the traffic signal 50B with reference to the information stored in the memory 22. The controller 21 confirms that the traffic signal 50A and the traffic signal 50B exist between the current position of the terminal apparatus 30 that is indicated by the travel information received from the terminal apparatus 30, and the destination. The controller 21 then identifies, as the candidate waiting point, a point ahead in a traveling direction of the current position of the terminal apparatus 30, at which the traffic signal 50 closest to the current position of the terminal apparatus 30 is installed. Referring to FIG. 7, the traffic signal 50 closest to and ahead in the traveling direction of the current position of the terminal apparatus 30 is the traffic signal 50A; therefore, the controller 21 identifies, as the candidate waiting point, the point at which the traffic signal 50A is installed.

Next, in step S203, the controller 21 calculates a predicted arrival time at which the terminal apparatus 30 is to arrive at the identified candidate waiting point. In this example, the controller 21 divides, by the travel speed of the terminal apparatus 30, a distance from the current position of the terminal apparatus 30 to the candidate waiting point, to calculate a travel time period to the candidate waiting point. The controller 21 calculates a result obtained by adding the calculated travel time period to the current time, as the predicted arrival time. In this example, the distance from the current position of the terminal apparatus 30 to the point at which the traffic signal 50A is installed is 80 m, and the travel speed of the terminal apparatus 30 that is notified from the terminal apparatus 30 is 80 m/min. In this example, the current time is 07:59:30 on Apr. 1, 2020. The predicted arrival time calculated from these figures is 08:00:30 on Apr. 1, 2020.

Next, in step S204, the controller 21 confirms, based on the calculated predicted arrival time and the switching information for the traffic signal 50 installed at the candidate waiting point, whether a waiting time period for the user 11 is to occur at the candidate waiting point. In a case in which a waiting time period is to occur, in step S205, the controller 21 detects the candidate waiting point as the waiting point. In a case in which a waiting time period is not to occur, the controller 21 does not detect the candidate waiting point as the waiting point, and ends the processing. In this example, referring to FIG. 3, at the predicted arrival time of 08:00:30 on Apr. 1, 2020, a signal lamp of the traffic signal 50A installed at the candidate waiting point displays a red stop signal, and it is thus known that traveling of the user 11 is to be limited at the candidate waiting point, and a waiting time period is to occur. Therefore, the controller 21 detects, as the waiting point, the candidate waiting point at which the traffic signal 50A is installed.

Next, in step S206, the controller 21 calculates, from the predicted arrival time and the switching information, the waiting time period for the user 11 at the waiting point. In this example, the controller 21 calculates, as the waiting time period, the difference between a switching time indicated by the switching information, at which signal lamps of the traffic signal 50A installed at the waiting point switch to a green go signal in the nearest future from the predicted arrival time, and the predicted arrival time. In this example, from FIG. 3, it is known that the time at which the traffic signal 50A switches in the nearest future from the predicted arrival time of 08:00:30 on Apr. 1, 2020 is 08:01:30 on Apr. 1, 2020. Therefore, the controller 21 calculates, as the waiting time period at the waiting point, one minute that is the difference between the predicted arrival time and the switching time.

In step S207, the controller 21 determines the degree to which the travel speed of the user 11 is to be reduced to delay the arrival of the user 11 at the waiting point until the time of the arrival and the switching time become identical. In this example, the controller 21 calculates a result obtained by dividing, by the difference between the current time and the switching time, the distance from the current position of the terminal apparatus 30 to the waiting point, as an ideal speed, and determines the difference between the ideal speed and the current travel speed as deceleration degree. In this example, the distance from the current position of the terminal apparatus 30 to the waiting point is 80 m, and the difference between the current time of 07:59:30 on Apr. 1, 2020, and the switching time of 08:01:30 on Apr. 1, 2020 is two minutes. Therefore, the controller 21 calculates, as the ideal speed, a speed of 40 m/min, and determines the difference between the calculated ideal speed and the current travel speed as the degree to which the travel speed of the user 11 is to be reduced.

Next, returning to FIG. 6B, in step S109, the controller 21 stores, in the memory 22, information notifying the user 11 of the degree to which the travel speed is to be reduced, that is determined in step S207 of FIG. 8, as the deceleration information for prompting the user 11 to decelerate. In step S110, the controller 21 transmits, to the terminal apparatus 30 via the communication interface 23, the deceleration information stored in the memory 22. That is, the controller 21 outputs the deceleration information. In this example, the controller 21 transmits, to the terminal apparatus 30 via the communication interface 23, deceleration information for prompting the user 11 to reduce the current travel speed of 80 m/min to 40 m/min.

In step S111, the controller 31 of the terminal apparatus 30 notifies, via the output interface 35, the user 11 of the deceleration information received from the control apparatus 20. In this example, the output interface 35 of the terminal apparatus 30 displays images illustrated in FIG. 9. The images illustrated in FIG. 9 are moving images simulating a metronome indicating the tempo of the user 11 when walking. Image M1 of FIG. 9 illustrates an image displayed when the terminal apparatus 30 receives, in step S110, the information for prompting deceleration, and image M2 of FIG. 9 illustrates an image displayed when the user 11 travels reducing the travel speed to the deceleration degree notified from the control apparatus 20. A pendulum of the metronome represented in white indicates the current travel speed of the terminal apparatus 30, and moves left and right in conjunction with vibrations of the user 11 when traveling, that are detected by the speed meter 37. A pendulum of the metronome represented in black moves left and right in conjunction with vibrations that are assumed to occur when the user 11 walks decelerating to the deceleration degree notified from the control apparatus 20 in step S111, and moves left and right in cycles slower than the pendulum of the metronome represented in white. In this example, the black pendulum of the metronome moves left and right in conjunction with vibrations of the user 11 when traveling, that are assumed to occur when the travel speed of the terminal apparatus 30 is reduced to 40 m/min. In image M1 of FIG. 9, a text message "Walk slowly so that the white pendulum synchronizes with the black pendulum!" is displayed while the white and black pendulums of the metronome are moving left and right, out of sync with each other. Thereafter, when the user 11 reduces the travel speed, thereby reducing the travel speed of the terminal apparatus 30, and the travel speed of the terminal apparatus 30 becomes 40 m/min, the pendulum of the metronome represented in white overlaps the pendulum of the metronome represented in black, as illustrated in image M2. Then, a text message "Keep up the pace!" is displayed. Image M1 is displayed while the travel speed of the user 11 is maintained at 40 m/min. Instead of being represented by the black pendulum of the metronome as illustrated in FIG. 9, the information for prompting the user 11 to decelerate may be output in the form of audio through a speaker of the terminal apparatus 30, or in the form of vibration to the user 11, through a vibration motor of the terminal apparatus 30.

In step S112 of FIG. 6B, the controller 21 of the control apparatus 20 confirms, according to the current position repeatedly notified from the terminal apparatus 30, that the user 11 has arrived at the waiting point. The control apparatus 20 notifies the terminal apparatus 30 that the user 11 has arrived at the waiting point. Upon receiving the notification, the terminal apparatus 30 stops performing display to prompt deceleration on the output interface 35. In this example, the terminal apparatus 30 stops displaying image M1 or image M2.

Processes from step S107 to step S112 are repeatedly executed until the terminal apparatus 30 arrives at the destination.

As described above, in the present embodiment, the controller 21 of the control apparatus 20 acquires route information indicating a route on which a user 11 is to travel, and travel information indicating a travel status of the user 11. The controller 21 detects, based on the acquired route information and the acquired travel information, a waiting point on the route, at which a waiting time period for the user 11 is to occur, and outputs deceleration information for prompting the user 11 to decelerate to delay, within a range of the waiting time period, arrival of the user 11 at the detected waiting point. The route information includes switching information indicating a switching timing for a traffic signal 50 installed at at least one point on the route. The controller 21 detects, as the waiting point, a point at which the traffic signal 50 is installed and at which the user 11 is to arrive while the corresponding traffic signal 50 displays a stop signal.

By being prompted to decelerate when traveling at a speed higher than normal, the user 11 can travel at a normal speed without worry knowing that there is no need to hurry. By being prompted to decelerate when traveling at a normal speed, the user 11 can travel slowly without worry to reduce or avoid the waiting time period.

As described above, in the present embodiment, the controller 21 calculates, in accordance with the travel status indicated by the travel information, a predicted arrival time at which the user 11 is to arrive at the detected waiting point, and calculates, as the waiting time period, the difference between the predicted arrival time and a switching time that is indicated by the switching information, at which the traffic signal 50 next switches to a go signal.

The controller 21 calculates, as the waiting time period, the difference between a time when the user 11 is to arrive at a point at which a traffic signal 50 on a road to be crossed next is installed, and a time at which the traffic signal 50 next switches to a go signal. The controller 21 prompts, via the terminal apparatus 30, the user 11 to reduce the travel speed to proceed, within a range of the calculated waiting time period. Since, to the user 11, the deceleration degree which enables arrival at the waiting point by the time when the traffic signal 50 next switches to the go signal becomes clear, the user 11 can easily travel performing the notified deceleration.

As described above, in the present embodiment, the controller 21 outputs, as the deceleration information, information for prompting the user 11 to decelerate to delay the arrival of the user 11 at the waiting point until a time of the arrival and the switching time become identical.

The controller 21 determines the deceleration degree so that the user 11 arrives at the waiting point when a time at which the user 11 arrives at the waiting point, and the time at which the traffic signal 50 next switches to the go signal become identical. Since, to the user 11, the deceleration degree which enables arrival at the waiting point when the traffic signal 50 next switches to the go signal, and enables continuous traveling without a waiting time period becomes clear, the user 11 can easily travel performing the notified deceleration.

As described above, in the present embodiment, the communication interface 23 of the control apparatus 20 communicates with a management apparatus 40 for controlling the traffic signal 50. The controller 21 of the control apparatus 20 acquires the switching information from the management apparatus 40 via the communication interface 23. The controller 21 calculates, based on the acquired switching information, the waiting time period for the user 11 to occur at the waiting point, and determines the degree of deceleration to be performed by the user 11. Since the user 11 can be notified of the degree of deceleration determined using the switching information from the management apparatus 40, the user 11 can easily travel performing the notified deceleration.

As described above, in the present embodiment, the communication interface 23 of the control apparatus 20 communicates with a terminal apparatus 30 for detecting the travel status of the user 11. The controller 21 of the control apparatus 20 acquires the travel information from the terminal apparatus 30 via the communication interface 23. The controller 21 calculates, based on the acquired travel information, the waiting time period for the user 11 to occur at the waiting point, and determines the degree of deceleration to be performed by the user 11. Since the user 11 can be notified of the degree of deceleration determined using the travel information from the terminal apparatus 30, the user 11 can easily travel performing the notified deceleration.

Second Embodiment

Hereinafter, differences between the first embodiment and the present embodiment will be described.

Figure 11:
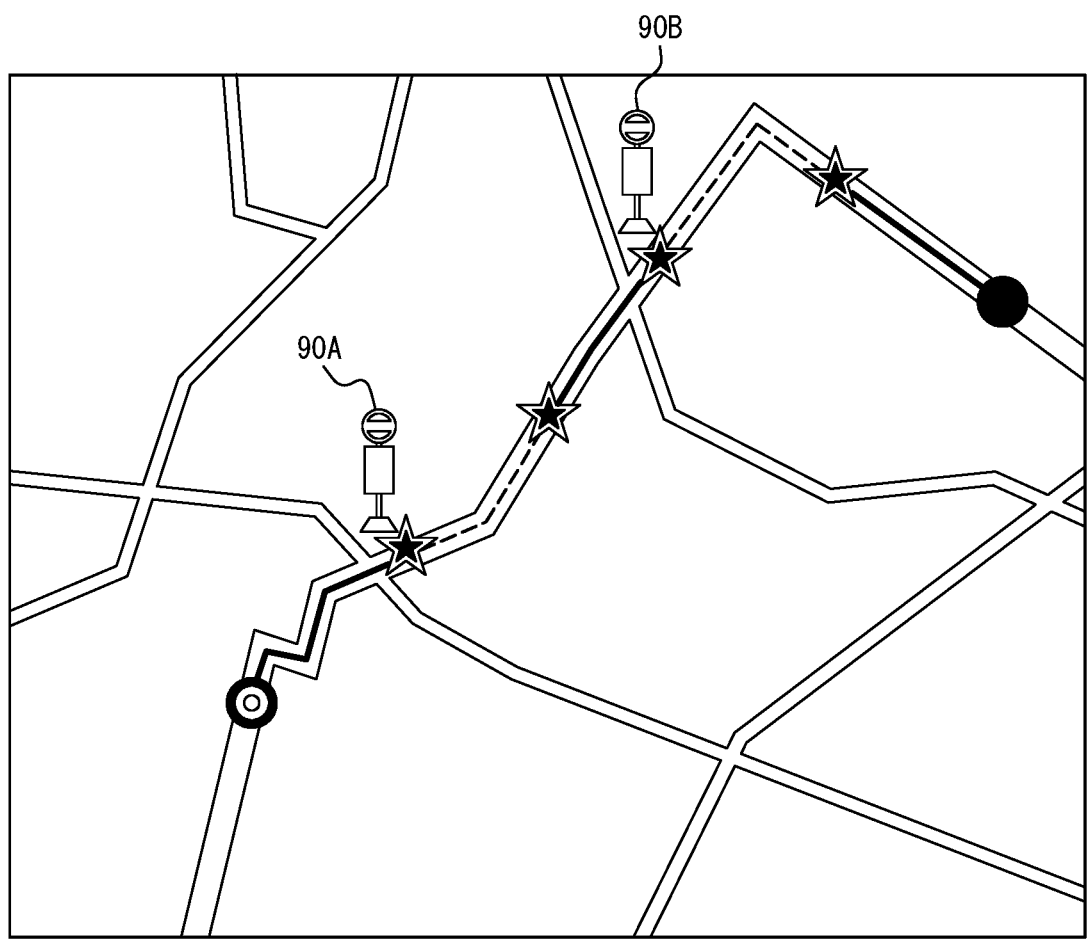
FIG. 11 is a diagram illustrating an example of a route in route guidance according to the second embodiment.

While the system 10 according to the first embodiment includes a management apparatus 40 for controlling traffic signals 50 and the traffic signals 50, a system 10 according to the present embodiment instead includes a management apparatus 40 for controlling transportation, and transportation stops such as a stop 90A and a stop 90B, as illustrated in FIG. 11. The "stops" are train platforms, bus stops, or the like.

The management apparatus 40 is installed in a facility of a transportation management company that manages operation of the transportation. The management apparatus 40 stores transportation timetables.

In the system 10 according to the present embodiment, similarly to the first embodiment, a control apparatus 20 acquires route information indicating a route on which a user 11 is to travel, and travel information indicating a travel status of the user 11. The control apparatus 20 detects, based on the acquired route information and the acquired travel information, a waiting point on the route, at which a waiting time period for the user 11 is to occur. The control apparatus 20 outputs deceleration information for prompting the user 11 to decelerate to delay, within a range of the waiting time period, arrival of the user 11 at the detected waiting point. In the first embodiment, the "route information" includes switching information indicating a switching timing for a traffic signals 50, and the "waiting point" includes a point at which the traffic signal 50 is installed, and at which the user 11 is to arrive while the traffic signal 50 displays a stop signal.

On the other hand, in the present embodiment, the "route information" includes operation information on transportation that departs from a stop located at at least one point on the route. Here, the "transportation" is specifically public transportation used by the user 11 while route guidance is provided, and includes a railway or a bus. The "bus" includes a route bus, a circulating bus that travels a specific section, or a circulating bus that travels within a facility such as an airport or a theme park. The "railway" includes a bullet train, a conventional line, or a streetcar. The "operation information" is information that is provided from the management apparatus 40, which is held by an operation company or the like that manages operation of the transportation, and indicates a transportation timetable. In the present embodiment, the "waiting point" includes a point at which the stop is located, and at which the user 11 is to arrive before a departure time.

According to the present embodiment, it is possible to lead users to slow down travel speeds while providing route guidance. Therefore, certainty in reducing waiting time periods is improved.

Figure 4:
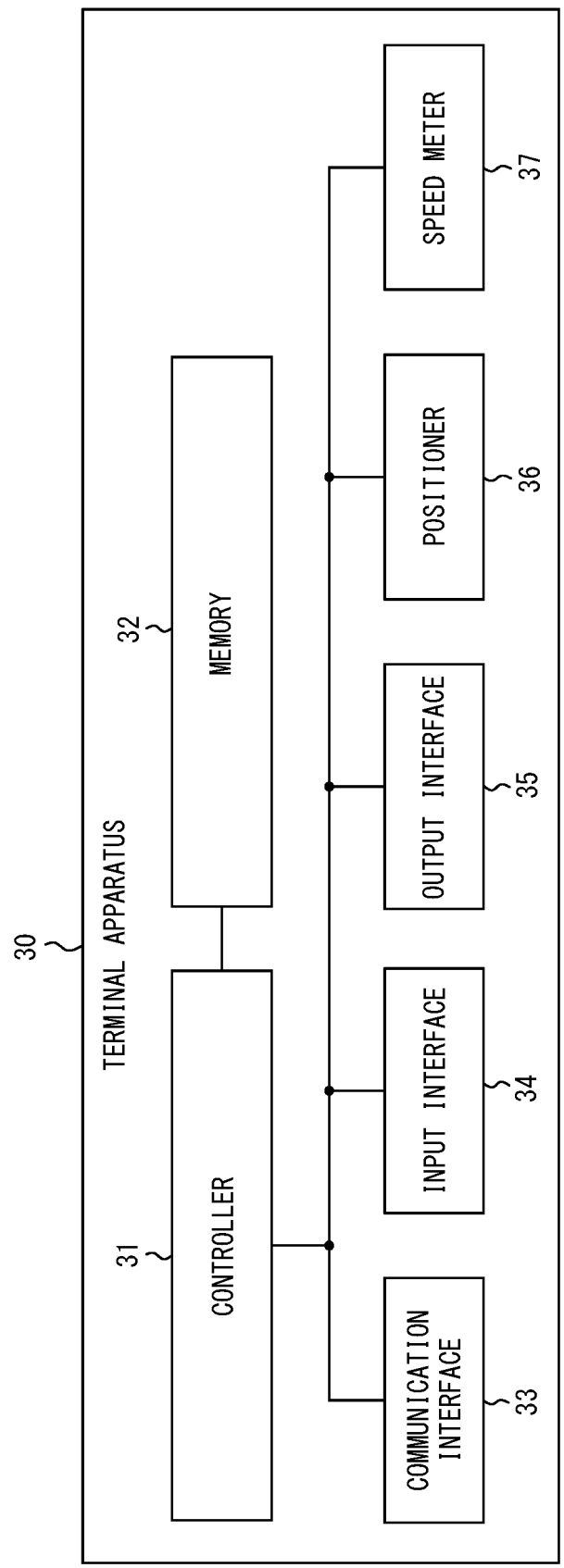
FIG. 4 is a block diagram illustrating a configuration of a terminal apparatus according to the first embodiment.

A configuration of a terminal apparatus 30 according to the present embodiment is the same as that of the first embodiment illustrated in FIG. 4, and therefore description thereof is omitted.

Figure 2:
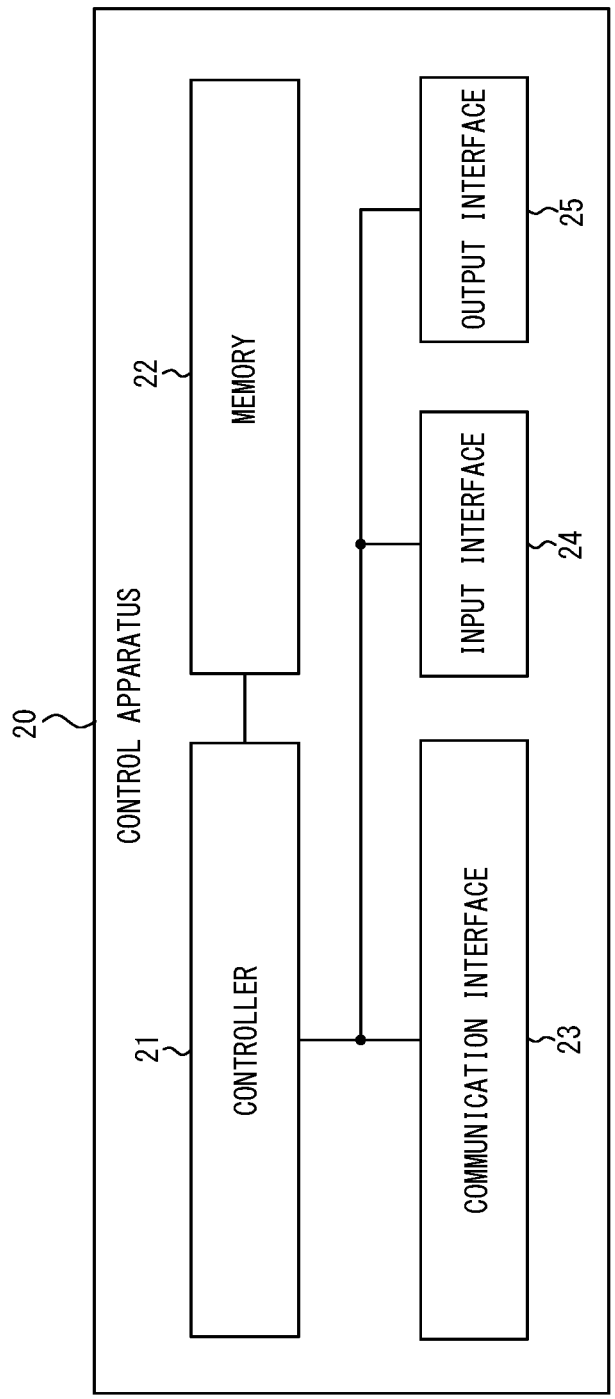
FIG. 2 is a block diagram illustrating a configuration of a control apparatus according to the first embodiment.

A configuration of the control apparatus 20 according to the present embodiment is the same as that of the first embodiment illustrated in FIG. 2, and therefore description thereof is omitted.

A memory 22 of the control apparatus 20 according to the present embodiment stores, instead of switching information for traffic signals 50 as in the first embodiment, operation information indicating departure times at which the transportation is to depart from the stop.

An example of "operation information" indicating departure times at which the transportation is to depart from the stop is shown in FIG. 10. In this example, the transportation is buses, and FIG. 10 illustrates a table of operation information for each of two stops 90A and 90B. In the table of FIG. 10, information on target stops and departure times of the buses from the respective stops is stored as the "operation information". For example, in the table of FIG. 10, information recorded in the first row following the title row indicates that a bus departs from the stop 90A at 07:50:00 on Apr. 1, 2020. Information recorded in the third row indicates that a bus departs from the stop 90A at 08:01:00 on Apr. 1, 2020. The table of FIG. 10 indicates that no bus departs from the stop 90A or the stop 90B at a time not recorded in the table. The operation information is acquired by the controller 21 from the management apparatus 40, which is held by the operation company, via the communication interface 23.

Figure 5:
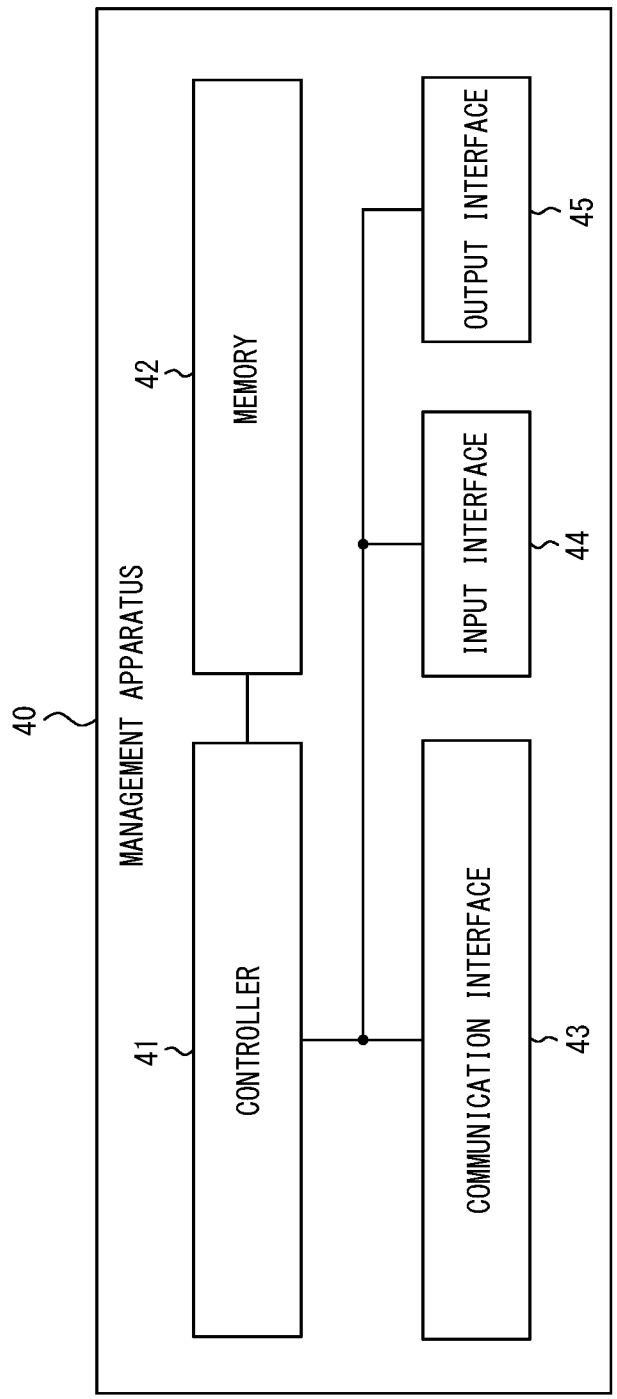
FIG. 5 is a block diagram illustrating a configuration of a management apparatus according to the first embodiment.

A configuration of the management apparatus 40 according to the present embodiment is the same as that of the first embodiment illustrated in FIG. 5, and therefore description thereof is omitted.

The memory 42 of the management apparatus 40 according to the present embodiment stores, instead of various parameters for controlling operations of the traffic signals 50, and switching information generated from the parameters as in the first embodiment, the operation information such as a timetable indicating a departure time at which the transportation is to depart from a stop.

Hereinafter, differences between the operations of the system 10 according to the first embodiment and operations of the system 10 according to the present embodiment will be described with reference to FIGS. 6A, 6B, 8, 9, 10, and 11. The operations of the system 10 according to the present embodiment correspond to a control method according to the present embodiment.

Steps S101 to S102 of FIG. 6A are the same as those in the first embodiment, and therefore description thereof is omitted.

In step S103, the controller 21 identifies all of stops of the transportation to be used by the user 11 on the determined route. The determined route in this example and points at which the stops to be identified are located are exemplified in FIG. 11. In this example, the transportation to be used by the user 11 is a bus, and the stops are bus stops. In FIG. 11, the determined route is illustrated by solid lines and dotted lines. The solid lines are routes on which the user 11 travels on foot, and the dotted lines are routes on which the user 11 travels by bus. Stars indicate sections from where the user 11 boards the bus to where the user 11 alights from the bus. The current position of the terminal apparatus 30 is illustrated by a double circle, and the destination is illustrated by a black circle. On the route to the destination, the stop 90A and the stop 90B are located, and the controller 21 identifies these stops. The controller 21 stores, in the memory 22, information on the stop 90A and the stop 90B that are identified.

In step S104, the controller 21 acquires, from the management apparatus 40 for controlling buses, operation information on buses departing from the stop 90A and the stop 90B that are identified. In this example, the controller 21 confirms that the stop 90A and the stop 90B have been identified with reference to the information stored in the memory 22. The controller 21 communicates with the management apparatus 40 via the communication interface 23, and acquires the operation information on the buses departing from the stop 90A and the stop 90B, as illustrated in FIG. 10. The controller 21 adds the acquired operation information to the route information to store the acquired operation information in the memory 22.

In step S105, the controller 21 transmits, to the terminal apparatus 30 via the communication interface 23, the route information stored in the memory 22, that indicates the determined route and includes the operation information.

Steps S106 to S107 are the same as those in the first embodiment, and therefore description thereof is omitted.

In step S108, the controller 21 of the control apparatus 20 performs operations of identifying a waiting point and of determining the degree to which the travel speed of the user 11 in possession of the terminal apparatus 30 is to be reduced.

Referring to FIG. 8, differences between operations of the controller 21 in step S108 according to the present embodiment and those according to the first embodiment will be described.

First, in step S201, the controller 21 confirms whether at least one of the stops identified in step S103 of FIG. 6A exists, on the route indicated by the route information, between the current position of the terminal apparatus 30 and the destination. In a case in which none of the stops exists, the controller 21 ends the processing. In a case in which one or more of the stops identified in step S103 exist, the controller 21 identifies, in step S202, a point where, among the identified stops, the stop at which the user 11 next arrives is located, as a candidate waiting point. In this example, first, the controller 21 confirms that the identified stops are the stop 90A and the stop 90B with reference to the information stored in the memory 22. The controller 21 confirms that the stop 90A and the stop 90B exist between the current position of the terminal apparatus 30 that is indicated by the travel information received from the terminal apparatus 30, and the destination. The controller 21 then identifies, as the candidate waiting point, a point ahead in a traveling direction of the current position of the terminal apparatus 30, at which the stop closest to the current position of the terminal apparatus 30 is located. Referring to FIG. 11, the stop closest to and ahead in the traveling direction of the current position of the terminal apparatus 30 is the stop 90A; therefore, the controller 21 identifies, as the candidate waiting point, the point at which the stop 90A is located.

Step S203 is similar to that in the first embodiment, and therefore description thereof is omitted. In this example, the distance from the current position of the terminal apparatus 30 to the point at which the stop 90A is installed is 80 m, and the travel speed of the terminal apparatus 30 that is notified from the terminal apparatus 30 is 80 m/min. In this example, the current time is 07:59:00 on Apr. 1, 2020. The predicted arrival time calculated from these figures is 08:00:00 on Apr. 1, 2020.

Next, in step S204, the controller 21 confirms, based on the calculated predicted arrival time and the operation information on the transportation departing from the stop located at the candidate waiting point, whether a waiting time period for the user 11 is to occur at the candidate waiting point. In a case in which a waiting time period is to occur, in step S205, the controller 21 detects the candidate waiting point as the waiting point. In a case in which a waiting time period is not to occur, the controller 21 does not detect the candidate waiting point as the waiting point, and ends the processing. In this example, referring to FIG. 10, at the predicted arrival time of 08:00:00 on Apr. 1, 2020, the bus has not departed from the stop 90A located at the candidate waiting point, and it is thus known that traveling of the user 11 is to be limited at the candidate waiting point, and a waiting time period is to occur. Therefore, the controller 21 detects, as the waiting point, the candidate waiting point at which the stop 90A is located.

Next, in step S206, the controller 21 calculates, from the predicted arrival time and the operation information, the waiting time period for the user 11 at the waiting point. In this example, the controller 21 calculates, as the waiting time period, the difference between a departure time indicated by the operation information, at which the bus departs from the stop 90A located at the waiting point in the nearest future from the predicted arrival time, and the predicted arrival time. In this example, from FIG. 10, it is known that the departure time at which the bus departs from the stop 90A in the nearest future from the predicted arrival time of 08:00:00 on Apr. 1, 2020 is 08:01:00 on Apr. 1, 2020. Therefore, the controller 21 calculates, as the waiting time period at the waiting point, one minute that is the difference between the predicted arrival time and the departure time.

In step S207, the controller 21 determines the degree to which the travel speed of the user 11 is to be reduced to delay the arrival of the user 11 at the waiting point until the time of the arrival and the departure time become identical. In this example, the controller 21 calculates a result obtained by dividing, by the difference between the current time and the departure time, the distance from the current position of the terminal apparatus 30 to the waiting point, as an ideal speed, and determines the difference between the ideal speed and the current travel speed as deceleration degree. In this example, the distance from the current position of the terminal apparatus 30 to the waiting point is 80 m, and the difference between the current time of 07:59:00 on Apr. 1, 2020, and the departure time of 08:01:00 on Apr. 1, 2020 is two minutes. Therefore, the controller 21 calculates, as the ideal speed, a speed of 40 m/min, and determines the deference between the calculated ideal speed and the current travel speed as the degree to which the travel speed of the user 11 is to be reduced.

Steps S109 to S112 of FIG. 6B are the same as those in the first embodiment, and therefore description thereof is omitted.

Processes from step S107 to step S112 are repeatedly executed until the terminal apparatus 30 arrives at the destination.

As described above, in the present embodiment, the route information includes operation information indicating a departure time at which transportation is to depart from a stop located at at least one point on the route. The controller 21 detects, as the waiting point, a point at which the stop is located and at which the user 11 is to arrive before the departure time at which the transportation is to depart from the stop.

The controller 21 prompts, via the terminal apparatus 30, the user 11 to reduce the travel speed to proceed. By being prompted to decelerate when traveling at a speed higher than normal, the user 11 can travel at a normal speed without worry knowing that there is no need to hurry. By being prompted to decelerate when traveling at a normal speed, the user 11 can travel slowly without worry to reduce or avoid the waiting time period.

As described above, in the present embodiment, the controller 21 calculates, in accordance with the travel status indicated by travel information, a predicted arrival time at which the user 11 is to arrive at the detected waiting point, and calculates, as the waiting time period, the difference between the predicted arrival time and a departure time that is indicated by the operation information, at which the transportation next departs from the stop.

The controller 21 calculates, as the waiting time period, the difference between a time at which the user 11 next arrives at the stop, and a time at which the transportation next departs from the stop. The controller 21 prompts, via the terminal apparatus 30, the user 11 to reduce the travel speed to proceed, within a range of the calculated waiting time period. Since, to the user 11, the deceleration degree which enables arrival at the waiting point by the time when the transportation next departs from the stop becomes clear, the user 11 can easily travel performing the notified deceleration.

As described above, in the present embodiment, the controller 21 outputs, as the deceleration information, information for prompting the user 11 to decelerate to delay the arrival of the user 11 at the waiting point until a time of the arrival and the departure time become identical.

The controller 21 determines the deceleration degree so that the user 11 arrives at the waiting point when a time at which the user 11 arrives at the waiting point, and the time at which the transportation next departs from the stop become identical. Since, to the user 11, the deceleration degree which enables arrival at the waiting point at the time when the transportation next departs from the stop, and enables continuous traveling without a waiting time period becomes clear, the user 11 can easily travel performing the notified deceleration.

As described above, in the present embodiment, the communication interface 23 of the control apparatus 20 communicates with a management apparatus 40 for controlling the transportation. The controller 21 of the control apparatus 20 acquires the operation information from the management apparatus 40 via the communication interface 23. The controller 21 calculates, based on the acquired operation information, the waiting time period for the user 11 to occur at the waiting point, and determines the degree of deceleration to be performed by the user 11. Since the user 11 can be notified of the degree of deceleration determined using the operation information from the management apparatus 40, the user 11 can easily travel performing the notified deceleration.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A system comprising:
   a terminal apparatus that detects a current position and travel speed of a user;
   a control apparatus comprising:
   a communication interface configured to communicate with the terminal apparatus and a management apparatus for controlling a transportation including a railway or a bus via a network;
   a memory that stores information on a departure point and a destination of the user;
   a controller configured to:
      determine a route to the destination in accordance with the information on the departure point and the destination stored in the memory, thereby acquiring route information indicating the determined route as a route on which the user is to travel by walking, and receive, from the terminal apparatus via the communication interface, information indicating the current position and the travel speed of the terminal apparatus, thereby acquiring travel information indicating a travel status of the user;
      acquire operation information indicating a departure time at which the transportation is to depart from a stop located at at least one point on the route from the management apparatus via the communication interface,
      detect, based on the acquired route information and the acquired travel information, a point at which the stop is located at which the user is to arrive before the departure time of the transportation as a waiting point on the route, at which a waiting time period for the user is to occur;
      determine, based on the travel information and the waiting time period, a degree to which the travel speed of the user is to be reduced and generate deceleration information that visually indicates a tempo of the user's walking and prompts the user to decelerate in order to delay, within a range of the waiting time period, arrival of the user at the detected waiting point;
      store the deceleration information; and
      transmit the deceleration information to the terminal apparatus via the communication interface,
      calculate, based on the travel information indicating the current position and the travel speed of the terminal apparatus, a predicted arrival time at which the user is to arrive at the detected waiting point, and
      calculate the waiting time period, based on the predicted arrival time and the operation information on the transportation departing from the stop located at the detected waiting point,
   wherein the terminal apparatus is configured to receive and display the deceleration information that visually indicates the tempo of the user's walking and prompts the user to decelerate, and periodically update the display of the deceleration information based on the travel information of the user, the displayed deceleration information being a moving image that moves with a moving frequency that varies based on the tempo of the user's walking.

2. The control apparatus according to claim 1, wherein the controller is configured to:
   calculate, as the waiting time period, a difference between the predicted arrival time and the departure time indicated by the operation information.

3. The control apparatus according to claim 2, wherein the controller is configured to output, as the deceleration information, information for prompting the user to decelerate to delay the arrival of the user at the waiting point until a time of the arrival and the departure time become identical.

4. A control method implemented with a system comprising a computer and a terminal apparatus, the method comprising:
   controlling the terminal apparatus to detect a current position and travel speed of a user;
   communicating with the terminal apparatus and a management apparatus for controlling a transportation including a railway or a bus via a network;
   storing information on a departure point and a destination of the user;
   determining a route to the destination in accordance with the information on the departure point and the stored destination, thereby acquiring route information indicating the determined route on which the user is to travel by walking, and receiving, from the terminal apparatus, information indicating the current position and the travel speed of the terminal apparatus, thereby acquiring travel information indicating a travel status of the user;
   acquiring operation information indicating a departure time at which the transportation is to depart from a stop located at at least one point on the route from the management apparatus;

detecting, based on the acquired route information and the acquired travel information, a point at which the stop is located at which the user is to arrive before the departure time of the transportation as a waiting point on the route, at which a waiting time period for the user is to occur;

determining, based on the travel information and the waiting time period, a degree to which the travel speed of the user is to be reduced and generating deceleration information that visually indicates a tempo of the user's walking and prompts the user to decelerate in order to delay, within a range of the waiting time period, arrival of the user at the detected waiting point;

storing the deceleration information;

transmitting the deceleration information to the terminal apparatus; and calculating, based on the travel information indicating the current position and the travel speed of the terminal apparatus, a predicted arrival time at which the user is to arrive at the detected waiting point; and calculating the waiting time period, based on the predicted arrival time and the operation information on the transportation departing from the stop located at the detected waiting point;

controlling the terminal apparatus to receive and display the deceleration information that visually indicates the tempo of the user's walking and prompts the user to decelerate, and periodically update the display of the deceleration information based on the travel information of the user, the displayed deceleration information being a moving image that moves with a moving frequency that varies based on the tempo of the user's walking.

* * * * *